(12) United States Patent
Zhang et al.

(10) Patent No.: US 10,321,070 B2
(45) Date of Patent: Jun. 11, 2019

(54) ELECTRONIC DEVICE WITH SELF-IMAGE CAPTURING FUNCTION AND SELF-IMAGE CAPTURING METHOD THEREOF

(71) Applicants: HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventors: Jun-Wei Zhang, Zhengzhou (CN); Tsung-Jen Chuang, New Taipei (TW); Sen Fan, Zhengzhou (CN)

(73) Assignees: HONGFUJIN PRECISION ELECTRONICS (ZHENGZHOU) CO., LTD., Zhengzhou (CN); HON HAI PRECISION INDUSTRY CO., LTD., New Taipei (TW)

( * ) Notice: Subject to any disclaimer, the term of this patent is extended or adjusted under 35 U.S.C. 154(b) by 78 days.

(21) Appl. No.: 15/602,124

(22) Filed: May 23, 2017

(65) Prior Publication Data

US 2017/0347040 A1    Nov. 30, 2017

(30) Foreign Application Priority Data

May 25, 2016  (CN) .......................... 2016 1 0352230

(51) Int. Cl.
| | |
|---|---|
| H04N 5/265 | (2006.01) |
| H04N 5/247 | (2006.01) |
| H04N 5/33 | (2006.01) |
| H04N 5/235 | (2006.01) |
| H04N 5/907 | (2006.01) |
| H04N 5/225 | (2006.01) |
| H04N 5/77 | (2006.01) |
| G06T 5/50 | (2006.01) |

(52) U.S. Cl.
CPC ............... *H04N 5/265* (2013.01); *G06T 5/50* (2013.01); *H04N 5/2258* (2013.01); *H04N 5/2351* (2013.01); *H04N 5/247* (2013.01); *H04N 5/33* (2013.01); *H04N 5/772* (2013.01); *H04N 5/907* (2013.01); *G06T 2207/10024* (2013.01); *G06T 2207/10048* (2013.01); *G06T 2207/20221* (2013.01)

(58) Field of Classification Search
None
See application file for complete search history.

(56) References Cited

U.S. PATENT DOCUMENTS

| | | | |
|---|---|---|---|
| 2005/0213147 A1* | 9/2005 | Minatogawa | G06F 17/30244 358/1.15 |
| 2017/0078591 A1* | 3/2017 | Petrov | H04N 5/332 |
| 2017/0303790 A1* | 10/2017 | Bala | H04N 5/23293 |

* cited by examiner

*Primary Examiner* — Eileen M Adams
(74) *Attorney, Agent, or Firm* — ScienBiziP, P.C.

(57) ABSTRACT

A self-image capturing method includes a user activating a capturing device, controlling a light detecting device to detect ambient light intensity around an electronic device, determining whether the light intensity detected by the light detecting device is less than a predetermined value, activating the infrared capturing device when determining that the light intensity detected by the light detecting device is less than the predetermined value, controlling the capturing device to capture a selfie image of the user in response to an operation from the user, controlling the infrared capturing device to capture an infrared selfie image, and synthesizing the two captured images into a single selfie image.

9 Claims, 3 Drawing Sheets

ELECTRONIC DEVICE WITH SELF-IMAGE CAPTURING FUNCTION AND SELF-IMAGE CAPTURING METHOD THEREOF

CROSS-REFERENCE TO RELATED APPLICATIONS

This application claims priority to Chinese Patent Application No. 201610352230.3 filed on May 25, 2016, the contents of which are incorporated by reference herein.

FIELD

The subject matter herein generally relates to image processing technology, and particularly to an electronic device with a self-image capturing function and a self-image capturing method.

BACKGROUND

Smart electronic devices like smart phones and tablet computers may have a front camera, which is convenient for selfie. However, the front camera usually does not have a flashlight, so the selfie effect of the electronic device is poor at night or under poor lighting conditions.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
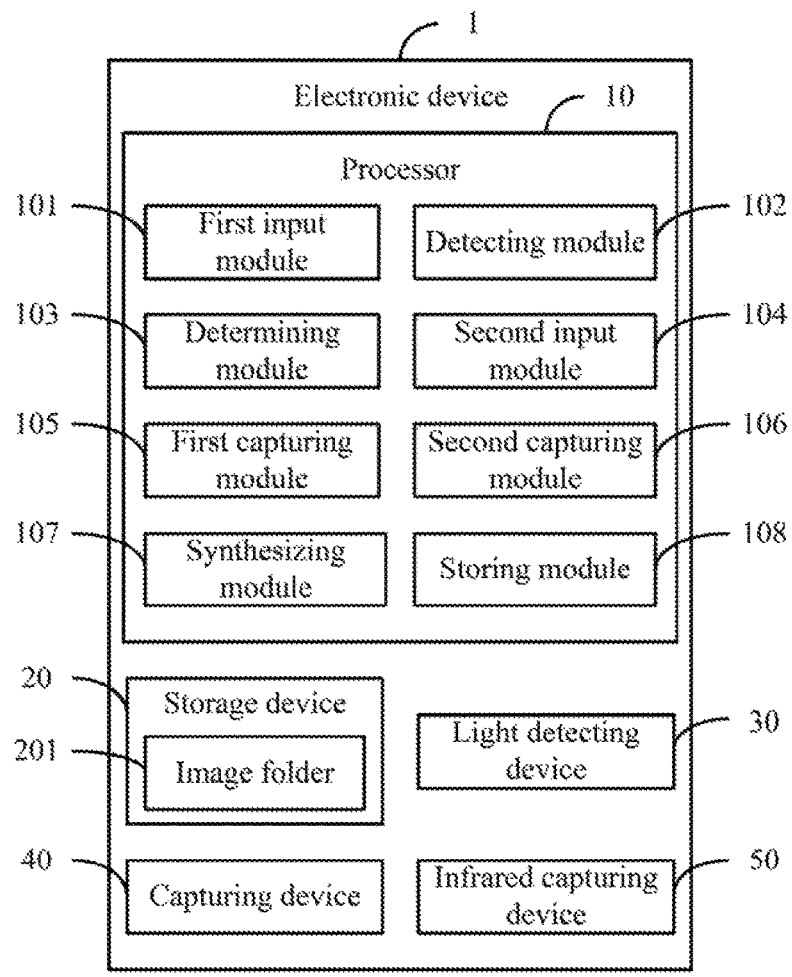
FIG. 1 is a block diagram of an exemplary embodiment of an electronic device with a self-image capturing function.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates an exemplary embodiment of an electronic device 1 with a self-image capturing function. In at least one exemplary embodiment, self-image capturing is taking an own image of a user by a capturing device. The electronic device 1 includes, but is not limited to, a processor 10, a storage device 20, a light detecting device 30, a capturing device 40, and an infrared capturing device 50. In at least one exemplary embodiment, the electronic device 1 can be a smart phone, a personal computer, or other device with capturing function. FIG. 1 illustrates only one example of the electronic device 1, other examples can include more or fewer components than as illustrated, or have a different configuration of the various components in other embodiments.

In at least one exemplary embodiment, the storage device 20 can include various types of non-transitory computer-readable storage mediums. For example, the storage device 20 can be an internal storage system, such as a flash memory, a random access memory (RAM) for temporary storage of information, and/or a read-only memory (ROM) for permanent storage of information. The storage device 20 can also be an external storage system, such as a hard disk, a storage card, or a data storage medium. The processor 10 can be a central processing unit (CPU), a microprocessor, or other data processor chip that performs functions of the electronic device 1.

In at least one exemplary embodiment, the light detecting device 30 can be a light sensor. The light detecting device 30 is used to detect light intensity around the electronic device 1.

In at least one exemplary embodiment, the capturing device 40 can be a camera. The capturing device 40 is used to capture images.

In at least one exemplary embodiment, the infrared capturing device 50 can be an infrared camera. The infrared capturing device 50 is used to capture infrared images.

As illustrated in FIG. 1, the electronic device 1 includes a first input module 101, a detecting module 102, a determining module 103, a second input module 104, a first capturing module 105, a second capturing module 106, a synthesizing module 107, and a storing module 108. The modules 101-108 can be collections of software instructions stored in the storage device 20 of the electronic device 1 and executed by the processor 10. The modules 101-108 also can include functionality represented as hardware or integrated circuits, or as software and hardware combinations, such as a special-purpose processor or a general-purpose processor with special-purpose firmware.

The first input module 101 activates the capturing device 40 in response to an activating operation from a user.

Figure 2:
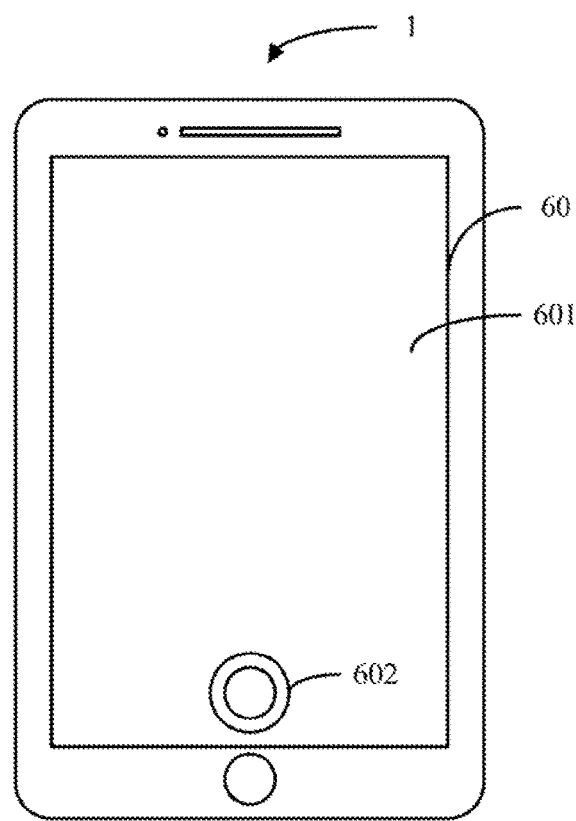
FIG. 2 is a schematic view of an exemplary embodiment of a capture interface of the electronic device.

Referring to FIG. 2, in at least one exemplary embodiment, a camera application is installed in the electronic device 1, and an icon (not shown) of the camera application is displayed on a home screen 60 of the electronic device 1. The first input module 101 activates the capturing device 40 in response to an operation of clicking the icon of the camera application from the user, and displays a capture interface 601 on the home screen 60 of the electronic device 1.

The detecting module 102 controls the light detecting device 30 to detect ambient light intensity around the electronic device 1.

In at least one exemplary embodiment, the detecting module 102 controls the light detecting device 30 to detect the ambient light intensity around the electronic device 1 after the capturing device 40 is activated. In other exemplary embodiments, the detecting module 102 also can control the light detecting device 30 to detect the ambient light intensity around the electronic device 1 in real time.

When the capturing device 40 is activated, the determining module 103 determines whether the light intensity detected by the light detecting device 30 is less than a predetermined value.

When the determining module 103 determines that the light intensity detected by the light detecting device 30 is less than the predetermined value, the second input module 104 automatically activates the infrared capturing device 50.

The first capturing module 105 controls the capturing device 40 to capture a selfie image of the user in response to an operation from the user.

In at least one exemplary embodiment, the capture interface 601 of the electronic device 1 displays a virtual camera key 602. The first capturing module 105 controls the capturing device 40 to capture the image of the user in response to an operation of clicking the virtual camera key 602 from the user.

When the capturing device 40 is capturing the image of the user, the second capturing module 106 controls the infrared capturing device 50 to capture an infrared selfie image of the user.

In at least one exemplary embodiment, the infrared capturing device 50 transmits infrared light, in which the infrared light includes infrared rays. When the infrared light reaches the user, the infrared light is reflected, then the infrared capturing device 50 receives the reflected infrared light. The infrared capturing device 50 converts the infrared light signals to electrical signals and generates the infrared image of the user according to the electrical signals.

The synthesizing module 107 synthesizes the selfie image captured by the capturing device 40 and the infrared selfie image captured by the infrared capturing device 50 to a single selfie image.

In at least one exemplary embodiment, the synthesizing module 107 synthesizes the selfie image captured by the capturing device 40, and the infrared selfie image captured by the infrared capturing device 50, to a single selfie image through image fusion technology.

In detail, the synthesizing module 107 preprocesses the selfie image and the infrared selfie image, in which the image preprocessing includes image denoising, image matching, and image enhancement. The synthesizing module 107 acquires luminance components of the selfie image and the infrared selfie image by means of color space converting, extracts marginal information of the luminance components of the image, fuses the marginal information of the image and the luminance components of the infrared image to fused luminance components. The synthesizing module 107 further assigns a pseudo color to the infrared image to generate a pseudo color infrared image, acquires hue components and saturation components of the pseudo color infrared image by means of color space converting, and acquires a fused image with the pseudo color according to the fused luminance components, the hue components, and the saturation components by means of color space inverse converting, thus, the fused image with the pseudo color is the synthesized selfie image.

The storing module 108 stores the selfie image captured by the capturing device 40, the infrared selfie image captured by the infrared capturing device 50, and the synthesized selfie image to the storage device 20.

In at least one exemplary embodiment, the electronic device 1 further includes an image folder 201 for the user to view the images. The image folder 201 can be a storage unit of the storage device 20. The storing module 108 further stores the selfie image captured by the capturing device 40, the infrared selfie image captured by the infrared capturing device 50, and the synthesized selfie image to the image folder 201.

Figure 3:
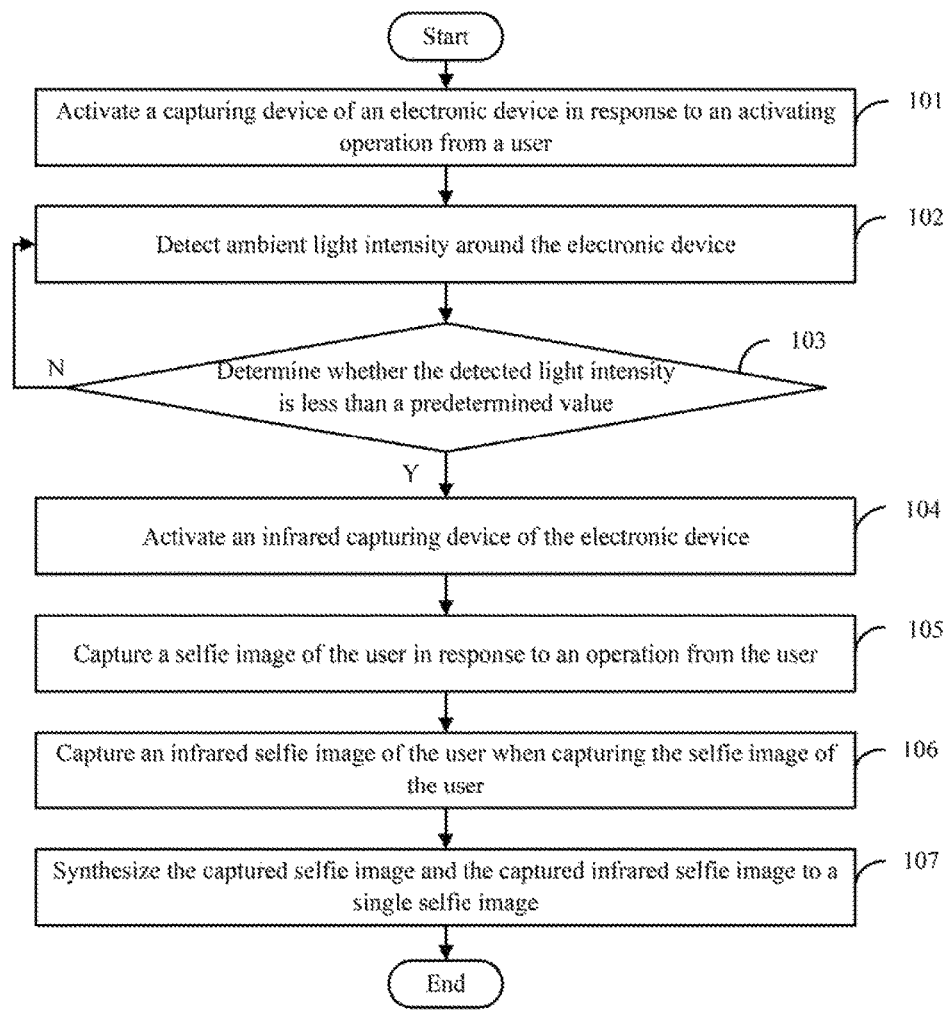
FIG. 3 illustrates a flowchart of an exemplary embodiment of a self-image capturing method.

FIG. 3 illustrates a flowchart of an exemplary embodiment of a self-image capturing method. The method is provided by way of example, as there are a variety of ways to carry out the method. The method described below can be carried out using the configurations illustrated in FIG. 1, for example, and various elements of these figures are referenced in explaining the example method. Each block shown in FIG. 3 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 101.

At block 101, a first input module activates a capturing device of an electronic device in response to an activating operation from a user.

At block 102, a detecting module controls a light detecting device to detect ambient light intensity around the electronic device.

At block 103, when the capturing device is activated, a determining module determines whether the light intensity detected by the light detecting device is less than a predetermined value. If the detected light intensity is less than the predetermined value, the process jumps to block 104. If the detected light intensity is greater than or equal to the predetermined value, the process returns to block 102.

At block 104, a second input module activates an infrared capturing device of the electronic device.

At block 105, a first capturing module controls the capturing device to capture a selfie image of the user in response to an operation from the user.

At block 106, when the capturing device is capturing the selfie image of the user, a second capturing module controls the infrared capturing device to capture an infrared selfie image of the user.

At block 107, a synthesizing module synthesizes the selfie image captured by the capturing device and the infrared selfie image captured by the infrared capturing device to a single selfie image.

In at least one exemplary embodiment, the synthesizing module preprocesses the selfie image and the infrared selfie image, in which the image preprocessing includes image denoising, image matching, and image enhancement. The synthesizing module acquires luminance components of the selfie image and the infrared selfie image by means of color space converting, extracts marginal information of the luminance components of the image, fuses the marginal information of the image and the luminance components of the infrared image to fused luminance components. The synthesizing module further assigns a pseudo color to the infrared image to generate a pseudo color infrared image, acquires hue components and saturation components of the pseudo color infrared image by means of color space converting, and acquires a fused image with the pseudo color according to the fused luminance components, the hue components, and the saturation components by means of color space inverse converting, thus, the fused image with the pseudo color is the synthesized selfie image.

Furthermore, the method includes storing the selfie image captured by the capturing device, the infrared selfie image captured by the infrared capturing device, and the synthesized selfie image into a storage device of the electronic device.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. An electronic device with a self-image capturing function comprising:
    at least one processor;
    a light detecting device electrically coupled to the at least one processor;
    a capturing device electrically coupled to the at least one processor;
    an infrared capturing device electrically coupled to the at least one processor;
    a storage device comprising an image folder electrically coupled to the at least one processor and storing instructions for execution by the at least one processor to cause the at least one processor to:
        activate the capturing device in response to an activating operation from a user;
        control the light detecting device to detect ambient light intensity around the electronic device;
        determine, when the capturing device is activated, whether the light intensity detected by the light detecting device is less than a predetermined value;
        activate the infrared capturing device when determined the light intensity detected by the light detecting device is less than the predetermined value;
        control the capturing device to capture a selfie image of the user in response to an operation from the user;
        control, when the capturing device is capturing the image of the user, the infrared capturing device to capture an infrared selfie image of the user;
        synthesize the selfie image captured by the capturing device and the infrared selfie image captured by the infrared capturing device to a single selfie image; and
        store the selfie image captured by the capturing device, the infrared selfie image captured by the infrared capturing device, and the synthesized selfie image into the image folder.

2. The electronic device according to claim 1, wherein the at least one processor is further caused to:
    store the selfie image captured by the capturing device, the infrared selfie image captured by the infrared capturing device, and the synthesized selfie image into the storage device.

3. The electronic device according to claim 1, wherein the at least one processor is further caused to:
    synthesize the selfie image captured by the capturing device and the infrared selfie image captured by the infrared capturing device to the selfie image through image fusion technology.

4. The electronic device according to claim 3, wherein the at least one processor is further caused to:
    preprocess the selfie image and the infrared selfie image;
    acquire luminance components of the selfie image and the infrared selfie image by means of color space converting;
    extract marginal information of the luminance components of the selfie image;
    fuse the marginal information of the selfie image and the luminance components of the infrared selfie image to fused luminance components;
    assign a pseudo color to the infrared selfie image to generate a pseudo color infrared image;
    acquire hue components and saturation components of the pseudo color infrared image by means of color space converting; and
    acquire a fused image with the pseudo color according to the fused luminance components, the hue components, and the saturation components by means of color space inverse converting.

5. The electronic device according to claim 1, wherein the infrared capturing device is an infrared camera.

6. A self-image capturing method comprising:
    activating a capturing device in response to an activating operation from a user;
    controlling a light detecting device to detect ambient light intensity around an electronic device;
    determining whether the light intensity detected by the light detecting device is less than a predetermined value when the capturing device is activated;
    activating the infrared capturing device when determined the light intensity detected by the light detecting device is less than the predetermined value;
    controlling the capturing device to capture a selfie image of the user in response to an operation from the user;
    controlling the infrared capturing device to capture an infrared selfie image of the user when the capturing device is capturing the image of the user;
    synthesizing the selfie image captured by the capturing device and the infrared selfie image captured by the infrared capturing device to a single selfie image; and
    storing the selfie image captured by the capturing device, the infrared selfie image captured by the infrared capturing device, and the synthesized selfie image into an image folder of the storage device.

7. The self-image capturing according to claim 6, further comprising:
    storing the selfie image captured by the capturing device, the infrared selfie image captured by the infrared capturing device, and the synthesized selfie image into a storage device.

8. The self-image capturing method according to claim 6, wherein the selfie image is synthesized through an image fusion method.

9. The self-image capturing method according to claim 8, wherein the image fusion method comprising:
    preprocessing the selfie image and the infrared selfie image;
    acquiring luminance components of the selfie image and the infrared selfie image by means of color space converting;
    extracting marginal information of the luminance components of the selfie image;

fusing the marginal information of the selfie image and the luminance components of the infrared selfie image to fused luminance components;

assigning a pseudo color to the infrared selfie image to generate a pseudo color infrared image;

acquiring hue components and saturation components of the pseudo color infrared image by means of color space converting; and acquiring a fused image with the pseudo color according to the fused luminance components, the hue components, and the saturation components by means of color space inverse converting.

\* \* \* \* \*